United States Patent
Wang

(10) Patent No.: US 7,743,224 B2
(45) Date of Patent: Jun. 22, 2010

(54) METHOD AND APPARATUS FOR VIRTUAL LOAD REGIONS IN STORAGE SYSTEM CONTROLLERS

(75) Inventor: Yuanru Frank Wang, Broomfield, CO (US)

(73) Assignee: Dot Hill Systems Corp., Longmont, CO (US)

( * ) Notice: Subject to any disclaimer, the term of this patent is extended or adjusted under 35 U.S.C. 154(b) by 669 days.

(21) Appl. No.: 11/326,800

(22) Filed: Jan. 6, 2006

(65) Prior Publication Data

US 2007/0162708 A1 Jul. 12, 2007

(51) Int. Cl.
G06F 9/44 (2006.01)
G06F 9/48 (2006.01)

(52) U.S. Cl. .............. 711/154; 717/168; 717/169; 717/170

(58) Field of Classification Search .............. 711/168
See application file for complete search history.

(56) References Cited

U.S. PATENT DOCUMENTS

| | | | |
|---|---|---|---|
| 4,327,410 A | | 4/1982 | Patel et al. |
| 5,812,857 A | | 9/1998 | Nelson et al. |
| 5,835,911 A | * | 11/1998 | Nakagawa et al. .......... 707/203 |
| 5,923,886 A | * | 7/1999 | Chen et al. .................. 717/170 |
| 6,185,734 B1 | * | 2/2001 | Saboff et al. ............... 717/164 |
| 6,237,091 B1 | | 5/2001 | Firooz et al. |
| 6,360,362 B1 | | 3/2002 | Fichtner et al. |
| 6,442,067 B1 | | 8/2002 | Chawla et al. |
| 6,581,157 B1 | | 6/2003 | Chiles et al. |
| 6,622,246 B1 | | 9/2003 | Biondi |
| 6,912,621 B2 | | 6/2005 | Harris |
| 6,915,513 B2 | | 7/2005 | Duesterwald et al. |
| 2002/0087759 A1 | * | 7/2002 | Toyoshima ................... 710/62 |
| 2003/0088735 A1 | | 5/2003 | Busser et al. |
| 2003/0229820 A1 | | 12/2003 | Chatterjee et al. |
| 2004/0010680 A1 | | 1/2004 | Smith et al. |
| 2004/0153738 A1 | * | 8/2004 | Otaka et al. ..................... 714/6 |
| 2005/0229021 A1 | | 10/2005 | Lubbers et al. |

OTHER PUBLICATIONS

International Preliminary Report on Patentability for International (PCT) Patent Application No. PCT/US2006/062615, mailed Oct. 2, 2008, 7 pages.
International Search Report and Written Opinion of the International Searching Authority for International (PCT) Patent Application No. PCT/US2006/062615, mailed Sept. 4, 2008, 8 pages.

* cited by examiner

*Primary Examiner*—Hetul Patel
(74) *Attorney, Agent, or Firm*—Thomas J. Lavan; Bradley Knepper

(57) ABSTRACT

Methods and apparatuses for facilitating the management of multiple controller code versions for implementing operational aspects of storage system controllers are provided. In particular, multiple versions of storage controller code are loaded into the physical memory of a storage controller. The logical region in which a particular controller code version is loaded may be designated in metadata as a primary, secondary or other region. The controller code that is associated with a logical version designated as the primary region is selected by the storage controller for execution upon a storage controller reboot. Accordingly, time consuming copy operations are not required in order to switch between different versions of storage controller code.

19 Claims, 4 Drawing Sheets

METHOD AND APPARATUS FOR VIRTUAL LOAD REGIONS IN STORAGE SYSTEM CONTROLLERS

FIELD

The present invention is directed to a data storage system controller. In particular, the present invention provides a controller that can switch between different sets of storage controller code.

BACKGROUND

The need to store digital files, documents, pictures, images and other data continues to increase rapidly. In connection with the electronic storage of data, various systems have been devised for the rapid and secure storage of large amounts of data. Such systems may include a number of storage devices that are used in a coordinated fashion. In particular, data can be distributed across multiple storage devices such that data will not be irretrievably lost if one of the storage devices (or in some cases, more than one storage device) fails. An additional advantage that can be achieved by coordinating operation of a number of individual storage devices is improved data access and/or storage times. Examples of systems that can provide such advantages can be found in the various RAID (redundant array of independent disks) levels that have been developed.

Many data storage systems, such as RAID array systems, utilize one or more controllers. Such controllers typically provide a read cache and a write cache to improve the performance of the data storage system with respect to input/output (IO) operations. For example, in connection with write operations, a host can provide data for storage that is initially placed in the write cache of a data system controller. Once the data has been placed in the write cache, the controller indicates to the host that the write operation has been completed, even though the data has not yet been stored on a data storage device or devices. This frees the host to move on to other operations while the controller completes the relatively slow process of storing the data that has been placed in the write cache on the storage device or devices.

In many applications, the availability of data is a key concern. In particular, in many applications, users rely heavily on the data stored in the data storage system. In these types of applications, unavailability of data stored on the data storage system can result in significant loss of revenue and/or customer satisfaction. Employing a data storage system comprising a RAID array can enhance the availability of the stored data, since if a single disk drive fails, data may still be stored and retrieved from the system.

The operation of the data storage system controller (or storage controller) is typically determined through the execution of controller code. In connection with certain storage controllers, multiple copies of controller code can be maintained in storage controller memory. In normal operation, only the code labeled as the primary copy is executed. In order to upgrade code in a typical dual copy storage controller, the primary code that is being replaced is copied from a primary region in memory to a second region in memory. Then, the new, upgraded code is copied to the primary region, thus the new code becomes the primary code. This method of code upgrading works, but it is slow and not robust because it involves a number of time consuming steps and the movement of relatively large amounts of code. In particular, an internal copy of the code from one region to another is required. Because the controller code is typically the size of several megabytes even though the code is compressed, operations copying code from one region and programming it to another region can take many seconds to complete. Furthermore, where there are many pieces of programmable code to copy on the storage controller, it may take many minutes just to complete the copy portion of the upgrade process. The time required becomes even greater in storage controllers that contain more than two sets of controller code. For example, a three copy programmable component, with three regions being labeled as the latest (newest) region, medium region and old region, involves the copy from the medium region to the old region and then from the latest region to the medium region before programming the downloaded code to the latest region. In addition, such methods of code upgrading are error prone because each programmable code component copy operation is an additional step that is subject to failure. The likelihood of such failure increases proportionally with the number of programmable code components the storage controller has and the number of code copies the storage controller maintains. In addition, such methods of code upgrading lack flexibility, as the newly loaded code is always designated as the primary copy or the latest copy designated for execution. Furthermore, the older version of the controller code is always overwritten, leaving the newer copy as the back-up for the downloaded code. This can be undesirable where the newer version of the code has a serious problem. However, storage controllers have been incapable of overwriting any set of code other than the oldest code in connection with downloading upgraded code.

SUMMARY

The present invention is directed to solving these and other problems and disadvantages of the prior art. In accordance with embodiments of the present invention, a storage controller capable of flexibly executing and upgrading storage controller code is provided. More particularly, the provided storage controller maintains multiple versions of storage controller code in storage controller memory. In addition, the storage controller maintains region management information designating a region in memory containing one of the sets of storage controller codes as a primary region. In order to change the copy of the storage controller code that is executed, all that is required is a reboot operation and a change of the region designated as the primary region in the region management information. No copying of storage controller code is required. In addition, new versions of storage controller code can be downloaded to the storage controller, without requiring that any one (or any one particular) previously loaded version of storage controller code be replaced.

In accordance with further embodiments of the present invention, a method for managing storage controller code is provided. The method includes storing first and second versions of storage controller code in first and second regions of storage controller memory. Region management information is also maintained in storage controller memory. The region management information includes a designation of one of the regions containing one of the versions of storage controller code as containing a primary version of the storage controller code. The storage controller code in the region designated as containing the primary version is then executed to control aspects of the operation of the storage controller. At the time of executing the version of storage controller code designated as the primary version, the second version of the storage controller code remains stored in a second region of the storage controller memory. In response to a change in the region designated as containing the primary code version, code in the newly designated region may be executed from that region following or as part of a reboot operation. Furthermore, the code previously designated as the primary version can remain in the region of memory that was previously designated as containing the primary version of code. Accordingly, no copying operations are required.

In accordance with still other embodiments of the present invention, the version of storage controller code designated as the primary version that is executed in order to control at least aspects of operation of the storage controller can be changed in response to detecting an error or failure of operation of the storage controller while running another version of the storage controller code. Still other embodiments of the present invention allow a number of copies of storage controller code in addition to a primary copy to be loaded in storage controller memory simultaneously. In particular, by designating in region management information the identity and status of different versions of storage controller code, a version of storage controller code for execution can be selected without regard to the relative order in which different versions of storage controller code were downloaded.

Additional features and advantages of embodiments of the present invention will become more readily apparent from the following description, particularly when taken together with the accompanying drawings.

DETAILED DESCRIPTION

Figure 1:
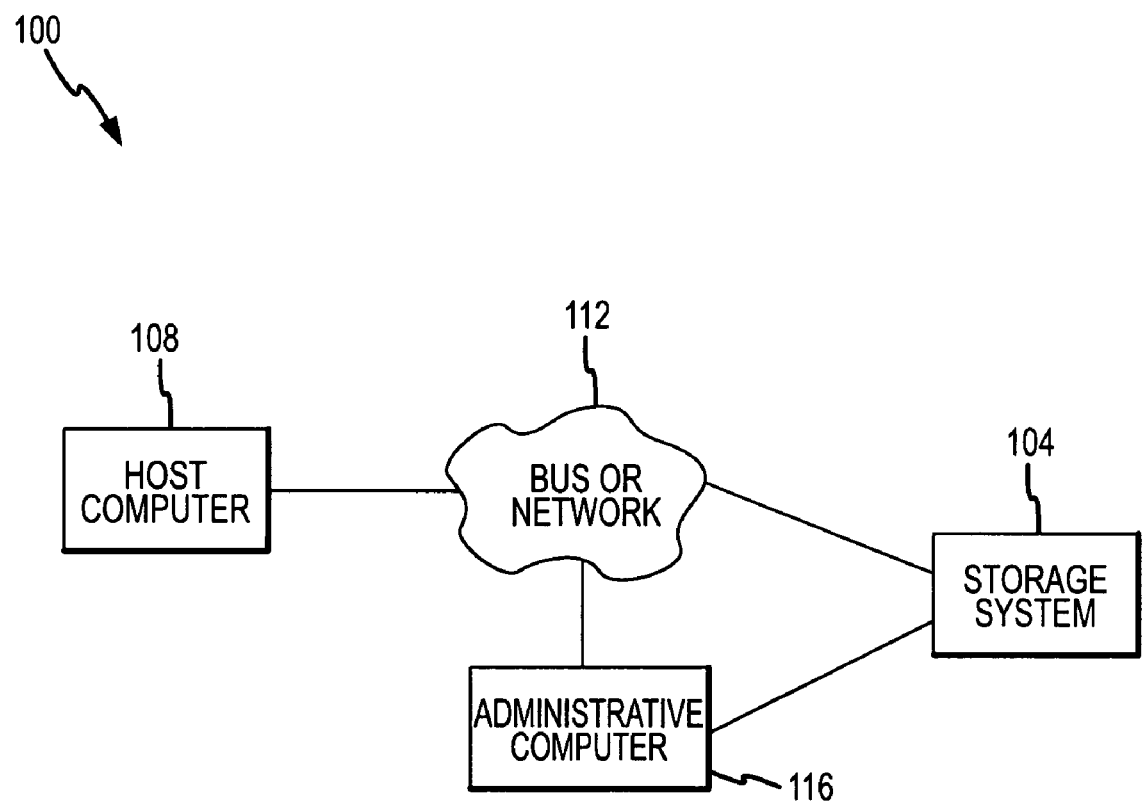
FIG. 1 is a functional block diagram depicting components of an electronic data system incorporating a data storage system in accordance with embodiments of the present invention.

FIG. 1 is a block diagram depicting an electronic data system 100 incorporating a data storage system 104 in accordance with embodiments of the present invention. In general, the data storage system 104 may be interconnected to one or more host processors or computers 108 by a bus and/or network 112. Accordingly, embodiments of the present invention have applications in association with single or multiple hosts 108 in storage area network (SAN) or direct connect environments. In accordance with still other embodiments, a data storage system 104 may be integrated with or directly connected to a host 108. In addition, a storage system 104 may be interconnected to an administrative computer 116. In general, an administrative computer 116 may provide a user interface for controlling aspects of the operation of the storage system 104. The administrative computer 116 may be interconnected to the storage system 104 directly, and/or through a bus or network 112. In accordance with still other embodiments of the present invention, an administrative computer 116 may be integrated with a host computer 108. In addition, multiple administrative computers 116 may be provided as part of the electronic data system 100. An electronic data system 100 may also include multiple data storage systems 104.

Figure 2:
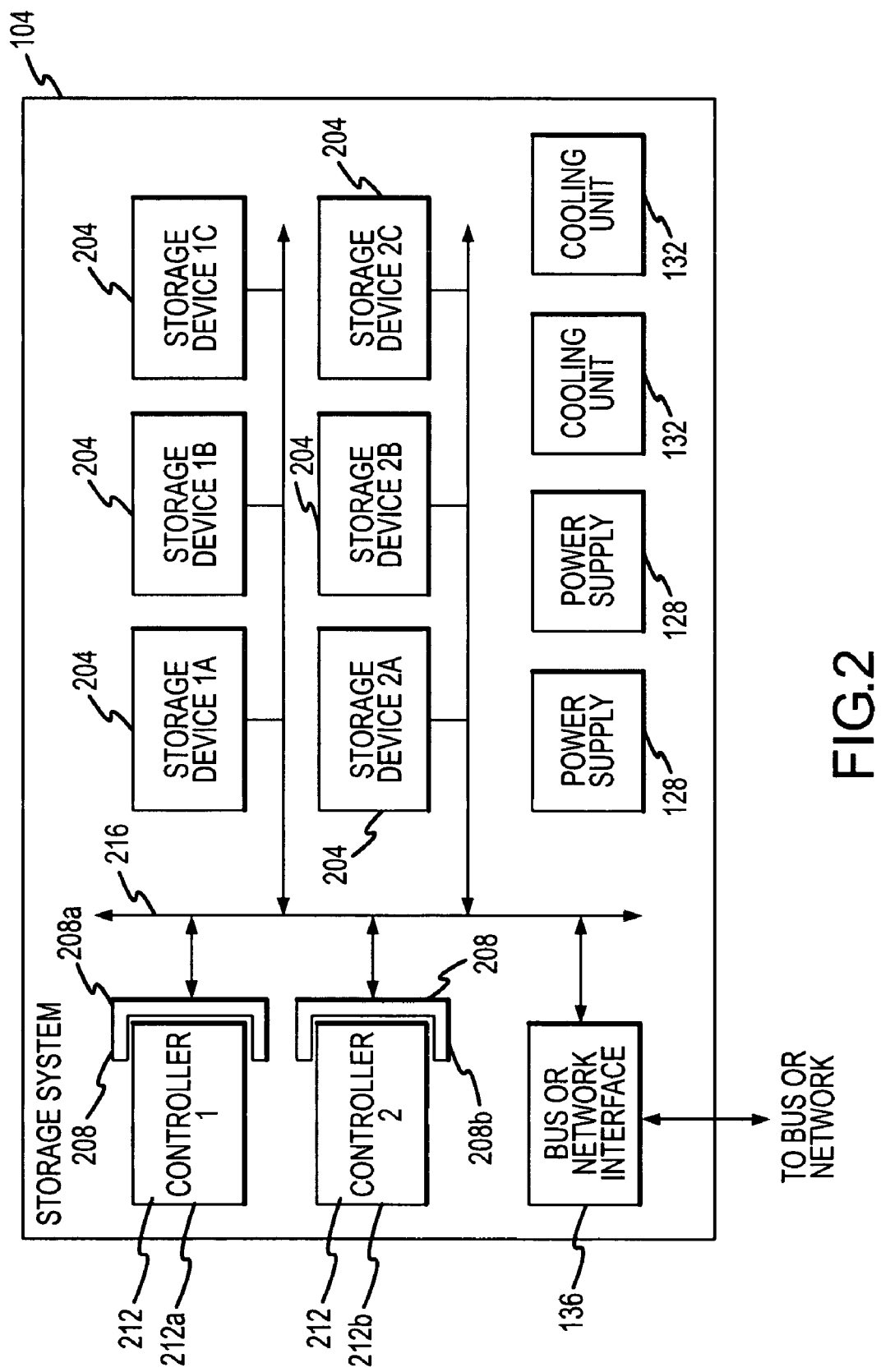
FIG. 2 is a block diagram depicting components of a data storage system in accordance with embodiments of the present invention.

FIG. 2 illustrates components that may be included in a data storage system 104 in accordance with embodiments of the present invention. In general, the data storage system 104 includes a number of storage devices 204. Examples of storage devices 204 include hard disk drives, such as serial advanced technology attachment (SATA), small computer system interface (SCSI), serial attached SCSI (SAS), Fibre Channel (FC), or parallel advanced technology attached (PATA) hard disk drives. Other examples of storage devices 204 include magnetic tape storage devices, optical storage devices or solid state disc devices. Furthermore, although a number of storage devices 204 are illustrated, it should be appreciated that embodiments of the present invention are not limited to any particular number of storage devices, and that a lesser or greater number of storage devices 204 may be provided as part of a data storage system 104. As can be appreciated by one of skill in the art, arrays and/or array partitions, hereinafter referred to as logical unit numbers (LUNs), may be established on the data storage devices 204. As can be further appreciated by one of skill in the art, a LUN may be implemented in accordance with any one of the various array levels or other arrangements for storing data on one or more storage devices 104.

A data storage system 104 in accordance with embodiments of the present invention may be provided with a first controller slot 208a. In addition, other embodiments may include additional controller slots, such as a second controller slot 208b. As can be appreciated by one of skill in the art, a controller slot 208 may comprise a connection or set of connections to enable a controller 212 to be operably interconnected to other components of the data storage system 104. Furthermore, a data storage system 104 in accordance with embodiments of the present invention includes at least one controller 212a. For example, while the data storage system 104 is operated in a single controller, non-failover mode, the data storage system 104 may include exactly one controller 212. The data storage system 104 in accordance with other embodiments of the present invention may be operated in a dual redundant active-active controller mode by providing a second controller 212b. When a second controller 212b is used in addition to a first controller 212a, the second controller 212b is received by a second controller slot 208b. As can be appreciated by one of skill in the art, the provision of two controllers, 212a to 212b, permits data to be mirrored between the controllers 212a to 212b, providing redundant active-active controller operation.

One or more busses or channels 216 are generally provided to interconnect a controller or controllers 212 through the associated controller slot or slots 208 to the storage devices 204. Furthermore, while illustrated as a single shared bus or channel 216, it can be appreciated that a number of dedicated and/or shared buses or channels may be provided. Additional components that may be included in a data storage system 104 include one or more power supplies 128 and one or more cooling units 132. In addition, a bus or network interface 136 may be provided to interconnect the data storage system 104 to the bus or network 112, and/or to a host computer 108 or administrative computer 116.

Figure 3:
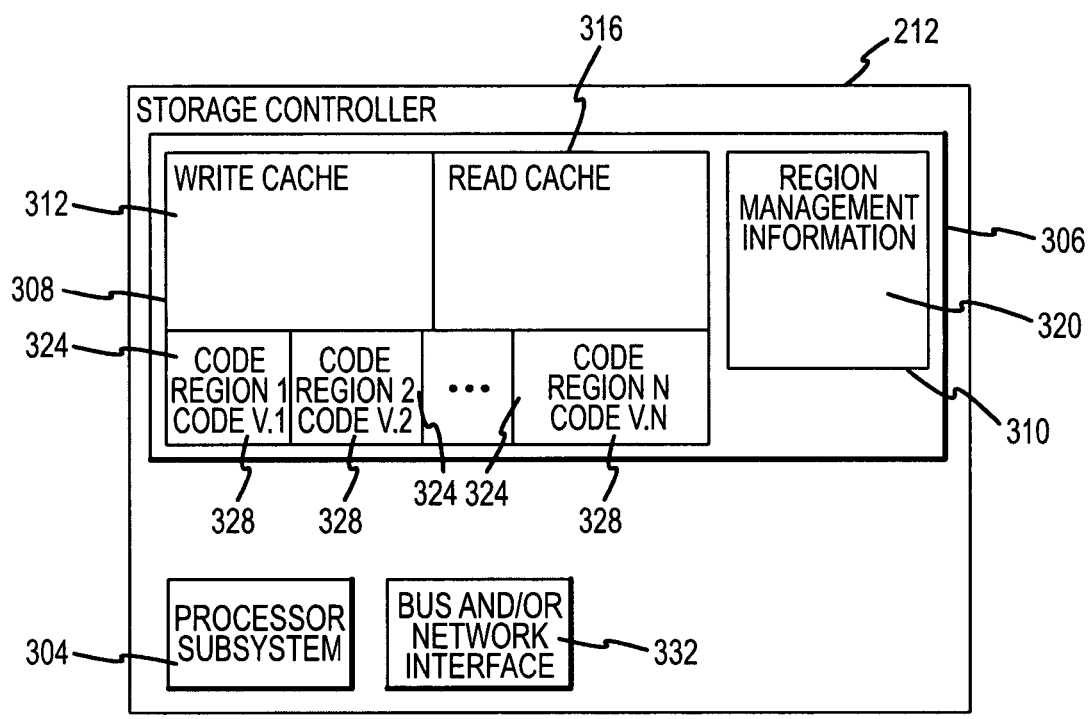
FIG. 3 is a block diagram depicting a storage controller of a data storage system in accordance with embodiments of the present invention.

FIG. 3 illustrates aspects of a storage controller 212 in accordance with embodiments of the present invention. In general, a storage controller 212 includes a processor subsystem 304 capable of executing instructions for performing, implementing and/or controlling various controller 212 functions. Such instructions may include the storage controller code stored in memory as described in the present disclosure. Furthermore, such instructions may be stored as software and/or firmware. As can be appreciated by one of skill in the art, operations concerning the generation of parity data or other operations may be performed using one or more hardwired and/or programmable logic circuits provided as part of the processor subsystem 304. Accordingly, the processor subsystem 304 may be implemented as a number of discrete components, such as one or more programmable processors in combination with one or more logic circuits. Processor subsystem 304 may also include or be implemented as one or more integrated devices or processors. For example, a processor subsystem 304 may comprise a complex programmable logic device (CPLD).

A controller 212 also generally includes memory 306. The memory 306 is not specifically limited to memory of any particular type. For example, the memory 206 may comprise a solid state memory device, or a number of solid state memory devices. In addition, the memory 306 may include separate volatile memory 308 and non-volatile memory 310 portions. As can be appreciated by one of skill in the art, the memory 306 typically includes a write cache 312 and a read cache 316 that are provided as part of the volatile memory 308 portion of the memory 306, although other arrangements are possible. By providing caches 312, 316, a storage controller 212 can improve the speed of input/output (IO) operations between a host 108 and the data storage devices 204 comprising an array or array partition.

The non-volatile memory 310 may be used to store region management information 320 as describe herein. In addition, a non-volatile memory portion 310 of memory 306 may be used to store data that was written to the write cache 312 of memory 306 in the event of a power outage affecting the data storage system 104. The non-volatile memory portion 310 of the storage controller memory 306 may include any type of data memory device that is capable of retaining data without requiring power from an external source. Examples of non-volatile memory 310 include, but are not limited to, compact flash, EPROMs, hard disk drives or other standardized non-volatile memory devices.

The memory 306 also includes portions comprising code regions 324 in which different versions of storage controller code 328 are stored. A set or version of storage controller code may comprise a number of components, such as a controller loader code component, a controller application code component, a controller field programmable gate array component, a complex programmable logic device code component, a power supply firmware code component, an embedded loop switch or fabric switch firmware code component, a management loader code component, and a management controller code component. Although three different code regions 324 and three different code versions 328 are shown in memory 306, it should be appreciated that embodiments of the present invention are not limited to any particular number of code regions 324 and code versions 328. In addition, it should be appreciated that a code region 324 is not necessarily a fixed block or set of addresses in memory, but instead may be defined by the addresses or locations in memory occupied by particular corresponding code version 328. As shown in FIG. 3, the code regions 324 may be established in a volatile memory 308 portion of the storage controller memory 306. More particularly, the code regions 324 need not comprise contiguous blocks of physical memory, but instead may comprise logically contiguous blocks, as defined in region management information 320. Furthermore, the region management information 320 may include a version designation for each of the different code versions 328 loaded in memory 306 (e.g. as primary, secondary, etc.). Alternatively or in addition, code regions 324 may be established in non-volatile memory 310.

A storage controller 212 may additionally include other components. For example, a bus and/or network interface 332 may be provided for operably interconnecting the storage controller 212 to the remainder of the data storage system 104, for example through a controller slot 208 and a bus or channel 216. Furthermore, the interface 328 may be configured to facilitate removal or replacement of the storage controller 212 in a controller slot 208 as a field replaceable unit (FRU). In addition, integral signal and power channels may be provided for interconnecting the various components of the storage controller 212 to one another.

Figure 4:
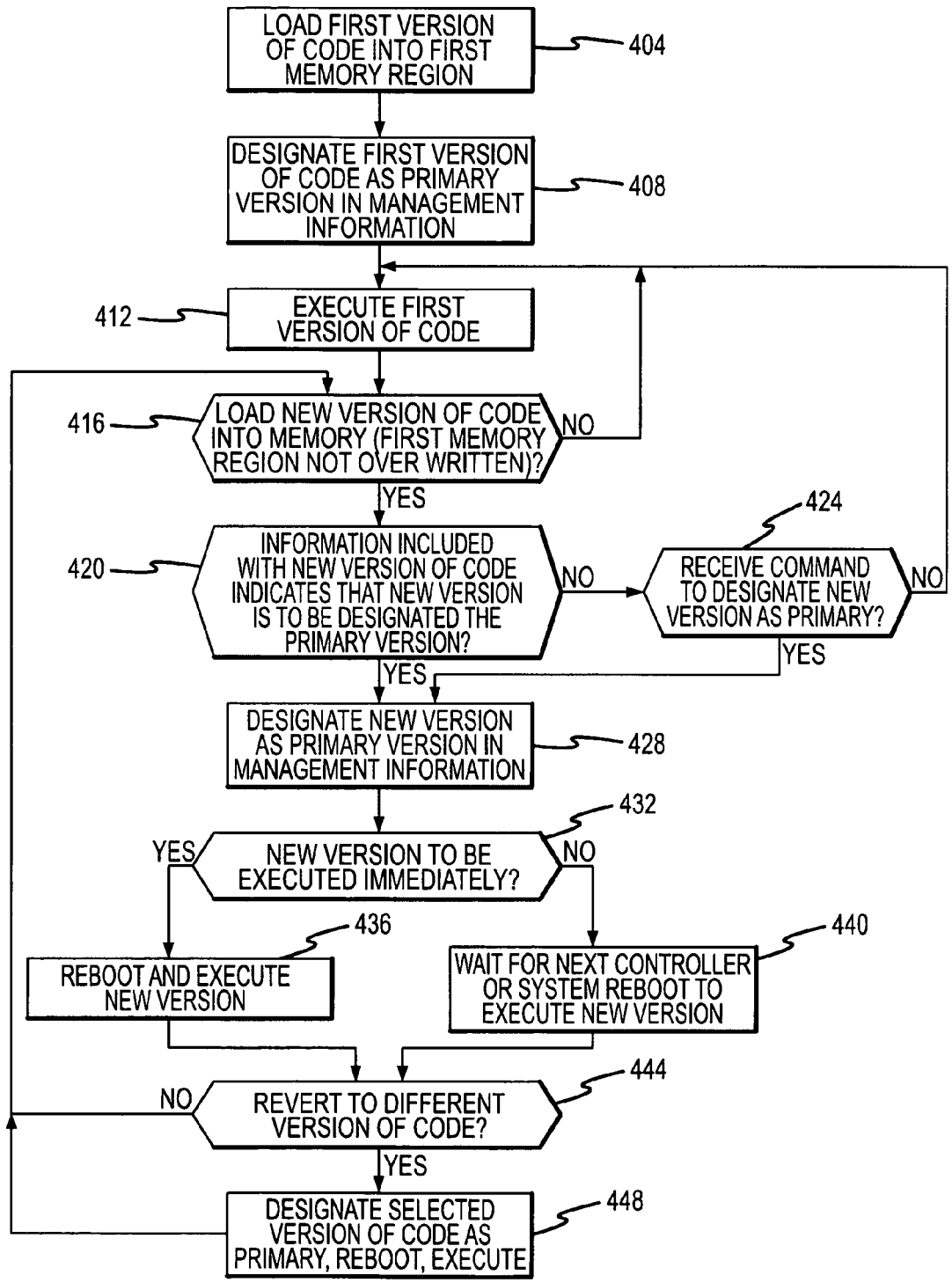
FIG. 4 is a flow chart illustrating aspects of the operation of a storage controller in accordance with embodiments of the present invention.

With reference now to FIG. 4, aspects of the operation of a storage controller 212 in accordance with embodiments of the present invention are illustrated. Initially, at step 404, a first version of controller code is loaded into a first memory region 328. As can be appreciated by one of skill in the art, loading a version of controller code into a memory region may comprise loading code into a number of physical locations in memory 306. Furthermore, the region 328 in which the version of controller code is loaded need not be contiguous. Accordingly, the code or memory region 328 containing the first version of controller code may comprise a logical grouping of data comprising the first version of controller code. The first version of controller code is then designated as the primary version in region management information 320 for the storage controller 212 (step 408). In accordance with embodiments of the present invention, the first version of controller code is loaded into a volatile memory 308 component of the storage component memory 306, while the region management information 320 is loaded into a non-volatile memory component 310 of the storage controller memory 306. At step 412, the first version of code, which has been designated the primary version is executed. Accordingly, the first version of the controller code is used to control operation of the storage controller.

At step 416, a determination is made as to whether a new version of controller code has been loaded into memory 306, without overwriting the first memory or code region 328. If a new version of controller code has not been loaded into memory 306, the process may return to step 412, and the first version of the controller code continues to be executed.

If a new version of controller code has been loaded into memory 306, a determination is then made as to whether information included with the new version of controller code indicates that the new version is to be designated the primary version (step 420). In accordance with the embodiments of the present invention, information may be included with a version of controller code related to region or version management information as part of a footer file included in the downloaded data. If there is no information included with the new version of controller code indicating that the new version is to be designated the primary version, a determination is then made as to whether a command has been received to designate the new version as primary (step 424). For example, a user may designate a new version of controller code as the primary version through a user input provided via an administrative computer 116 in communication with the data storage system 104. If no command to designate the new version as the primary version is received, the process may return to step 412, and the first version of controller code 328 continues to be executed. The new version of controller code will then remain loaded into a region 324 of memory 306, available if needed or desired for execution as the primary version at a later time.

If information included with the new version of code indicates that the new version is to be designated the primary version, or if a command to designate the new version of controller code as primary is received, the new version is designated as the primary version of controller code in the region management information 320 (step 428). A determination is then made at step 432 as to whether the new version of controller code is to be executed immediately. If the new version is to be executed immediately, the storage controller 212 is rebooted and the new version of controller code is executed (step 436). If the new version of controller code is not to be executed immediately, the storage controller 212 waits for the next storage controller 212 or data storage system 104 reboot to execute the new version of controller code (step 440). After initiating a reboot and executing the new version (at step 436) or after waiting for the next reboot and executing the new version of controller code (at step 440) a determination is made as to whether a decision or command to revert to a different version of controller code has been made or received (step 444). For example, problems may be encountered in connection with the execution of a new version of controller code that were not present during execution of another version of controller code. Therefore, it may be desirable to revert to execution of the earlier version of controller code. Alternatively, a decision or command may be made or received to change to a version of code that was previously loaded into storage control or memory 306, but that was not selected for execution.

If it is determined that the storage controller 212 is to revert to execution of a selected earlier or different version of storage controller code 328, the selected version of storage controller code 328 is designated as the primary version, the storage controller 212 is rebooted, and the newly designated version of controller code 328 is executed (step 448). The designation of a selected version of code as the primary version may be made by placing that designation in region management information 320, while removing a designation in the region management information 320 of another version of storage controller code 328 as the primary version. The newly designated version can then be executed after the storage controller 212 is rebooted. Notably, the newly designated version of storage controller code 328 can be executed from the code region 324 in which the version of controller code was originally loaded or stored. That is, that version of controller code does not need to be copied from one location or logical region in memory to another in order to be executed as the primary version of controller code. Furthermore, the selection of a new version of controller code 328 for execution as the primary version does not require the removal or overwriting of the version of controller code 328 that was previously designated as the primary version. Instead, all that is required is a change in the code version 328 designated in the region management information 320 as the primary version and a reboot of the storage controller 212. In particular, after the reboot, the region management information 320 will point to the region 324 in memory containing the version of controller code 328 now designated as primary, and that version 328 now designated as primary will be executed. The version of controller code 328 previously designated as primary will now be designated as secondary (or some other version designation other than primary), and can remain in its original location in memory 306. Accordingly, changes in the version of controller code 328 being executed can be implemented without delays due to copying. In addition, prior versions of controller code 328 may be maintained in memory 306 in case a prior version 328 is need later, for example where it is determined that the prior version of controller code 328 was superior to the version of controller code 328 later selected for execution.

After executing a different version of controller code 328 or continuing execution of a previously selected version of controller code 328 at steps 444 or 448, the process may return to step 416 to determine whether a new version of controller code 328 has been loaded into memory 306. Accordingly, embodiments of the present invention allow for the flexible loading of different versions of controller code 328, and the selection of different versions of controller code for execution, without requiring copying operations or the removal of older versions of controller code. Furthermore, the number of controller code versions 328 that can be stored in memory 306 is not limited to any particular number.

From the description provided, it can be appreciated that metadata comprising information loaded with a controller code version 328 and/or the region management information 320 determines whether a particular version of controller code 328 is the primary version that is executed for operation of the storage controller 212. Furthermore, it can be appreciated that the physical location of controller code 328 within memory 306 does not determine whether a particular set of controller code is executed as the primary version.

A version of code 328 may be associated with information related to how the code is to be treated by the storage controller. This information can include region management information 320, and can be provided to the storage controller as part of a footer file associated and downloaded with a code version 328. In accordance with embodiments of the present invention, the information associated with a code version 328 is checked once the code version 328 has been downloaded to the virtual code region. The information can indicate whether the logical region occupied by the downloaded code version is to be treated as the primary version of controller code or the secondary (or other) version. Particular information that may be provided includes version information such as a version identifier. A time stamp can be included to indicate when the code file was built. A delayed start flag can be set to indicate the associated code version 328 is not to be started immediately once it has been downloaded. If a delayed start flag is not set, the storage controller 212 will reboot and start the downloaded code after the download operation is complete. Another example of information that may be included is an overwrite latest flag. If the overwrite latest flag is set, the associated code version 328 will overwrite and replace the version of code 328 that is the latest version then fully loaded on the storage controller 212. If the overwrite latest flag is not set, the storage controller 212 can overwrite the oldest version of controller code 328 loaded on the storage controller. Alternatively, the downloaded controller code version 328 can be loaded into a new location in memory.

The region management information 320 may include various controller code region 324 management information, in connection with managing controller code versions 328. For example, a global delayed start flag may be maintained in region management information 320. If the global delayed start flag is set, a newly downloaded version of controller code 328 will not start until there is a data storage system 104 or storage controller 212 reboot operation. If the global delayed start flag is cleared, a delayed start flag provided in the footer information with downloaded controller code will determine whether the downloaded code is started right away or not. A global overwrite latest flag allows the downloaded code to replace newer code (or a number of copies of code if they are identical to the previously downloaded version of controller code). If the global overwrite latest flag is cleared, the overwrite latest flag provided in footer information associated with downloaded controller code will determine if downloaded code will overwrite a previously downloaded version of controller code.

The logical region is the primary region flag is set if the logical region of an associated code version is the primary region (i.e. the logical region 324 for the code version 328 is to be executed as containing the primary region). Instead of a Boolean, the logical region is the primary region flag can be an enumeration where more than two different controller code versions 328 can reside in the storage controller 212 memory 306. A logical region is the primary region flag can be associated with each controller code component comprising a complete controller code version 328. As a result, different pieces or components of different versions of controller code 328 can be selected for execution. In addition, the logical region is the primary region flag can lock a code component to its fixed physical region, which is useful when the code component must be the same in multiple regions for fault tolerance, such as in connection with a loader code component. The logical region is the primary region flag can also be used to synchronize certain components with the same link. For example, different code components can have their logical regions linked to primary regions. This is useful when certain code components have dependencies and always need to be upgraded all at the same time, such as controller application code and field programmable gate array (FPGA) code components.

In a typical embodiment, out of manufacturing, the storage controller memory 212 will contain version 1 of the controller code 328 in both the primary and secondary regions 324 of memory 306. The logical region is the region used for the code to run in, and the logical region of the first copy of the controller code 328 is set as the primary. That is, the logical region that is executed by the storage controller 212 is the controller code version marked as primary. Accordingly, the controller code that is executed is determined by the region management information, rather than the physical location of controller code in memory 306. Typical flag settings for a shipped storage controller 212 include: delayed start flag is not set; the global delayed start flag is not set; the global overwrite latest flag is not set; and the logical region is primary region flag is set.

As an example of the operation of a storage controller 212 in accordance with an embodiment of the present invention, once it is determined that there is a need to upgrade the original storage controller code version 328 to version 2, the new (version 2) controller code version 328 is loaded into memory 306. The code can be loaded into memory 306 via an out-of-band/or in-band connection with an administrative computer 116 or other source of code. Examples of out-of-band upgrade methods are Ethernet, Telnet, CLI, or serial. Examples of in-band methods are FC, iSCSI, SAS, or SCSI. The new controller code version 328 is initially downloaded to a virtual region of memory 306. The virtual region serves to link logical regions 324 in memory to physical regions in memory 306. After downloading the new controller code version 328 to the storage controller memory 212, the flags included in the footer file associated with the new controller code version 328 are checked.

For example, the flags may be checked to determine whether an overwrite latest flag and a logical region is primary region flag for an existing controller code set are true. If an overwrite latest flag is not true and the flag logical region is primary region is true for an existing controller code set, the downloaded code will be programmed to the physical region where it is not linked with the logical region containing the controller code being executed. That is, the physical region containing the downloaded code will be treated as corresponding to or occupying a secondary (or other) version of controller code 328. If an overwrite latest flag is true, the downloaded code is programmed to both the primary region and the secondary region, if only one version of prior code exists on the storage controller 212 when the updated controller code version 328 is downloaded.

If a delayed start flag is not true, the storage controller 212 will reboot immediately after the programming is complete. The system reboot will boot with the code from the desired logical region, which is accomplished with a hardware assist. Specifically, the processor 304 registers, for example the complex programmable logic device (CPLD) registers, are used to direct where in physical memory 306 the controller code version 328 occupying the primary logical region 324 is fetched from. If a delayed start flag is not true, the system will not reboot. Instead the current code will continue to run until the next time there is a system reboot, at which time the newly downloaded code will automatically start running.

When there is a need for a third version of controller code 328, the downloaded code can be programmed to the primary region. In particular, after the program comprising the third version of controller code 328 is completely downloaded, the logical region is primary region flag for that third version can be set, and the storage controller 212 will boot up version three of the controller code 328. If version three of the controller code 328 is not good, and experiences a failure, such as a watch dog timer failure, the storage controller 212 will automatically reboot with the second version of the controller code 328. If the overwrite latest flag is true, version one will be retained and version two will be overwritten by version three of the controller code 328. This is accomplished by programming the downloaded code to the secondary region, as the logical region is primary region flag is not set if the overwrite latest flag is true, indicating that the secondary region is linked to the logical region. After the program is complete, the logical region is the primary region will remain not set. Assuming there is no delayed start, the storage controller 212 will boot up with version three of the controller code 328 after the programming is complete.

In accordance with embodiments of the present invention, a user may choose which copy or version of the programmable controller code 328 in memory 306 of a storage controller 212, or which version of a controller code component, is run. The user may make such a selection through a management interface, such as a command line interface (CLI), a web browser interface (WBI), a menu user interface (MUI), or any other interface between an administrative computer 116 and a storage system 104 storage controller 212. The user may also specify other management information, including whether delayed start operation is needed. As can be appreciated by one of skill in the art, at least some of these user interfaces may comprise a graphical user interface (GUI) running on or through an administrative computer 116. The GUI may display various information, including the versions of all programmable code components of all controller code versions 328 residing in storage controller memory 306. The GUI can also allow the user to select which code to run either immediately or at the next system reboot. Other user interfaces, such as the command line interface, allows the user to specify which version of the controller code 328 to run, the time stamp of the code to run, or the primary region or the secondary region of the code to run.

For example, the user may pick version two of controller code 328 to run. If version two is in the secondary region 328, the logical region is primary region flag for the version executing as the primary region will be cleared. If the user picks version two to run immediately, a system reboot will occur immediately. If the chooses to run version two at the next system reboot, the delayed start flag will be set. In addition, a user can revert back to earlier versions of controller code 328 that are still resident in memory 306 by entering commands through an administrative computer 116.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method for managing storage controller code, comprising:
   storing a first version of storage controller code in a first region of storage controller memory associated with a first storage controller;
   storing a second version of storage controller code in a second region of said storage controller memory associated with said first storage controller;
   maintaining region management information in storage controller memory, wherein said region management information is not stored in said first or second regions of said storage controller memory;
   determining from information included in one of the first and second versions of storage controller code that said first or second version of storage controller code is to be designated said primary version, wherein said determining comprises said first storage controller reading said first and second versions of storage controller code;
   in response to determining from said information included in one of the first and second versions of storage controller code that said first or second version of storage controller code is to be designated said primary version, designating in said region management information said primary version of storage controller code;
   in response to said determining said primary version, executing said primary version to control at least aspects of operation of said first storage controller, wherein at said time of executing said first version of storage controller code is stored in said first region of said storage controller memory and said second version of storage controller code is stored in said second region of said storage controller memory;
   detecting a failure in operation of said first storage controller while executing said primary version of said storage controller code;
   in response to said detecting a failure of operation of said first storage controller while executing said primary version of said storage controller code:
      a) stopping execution of said primary version of said storage controller code;
      b) designating in said region management information the other of the first or second version of storage controller code originally designated as the primary version of storage controller code and removing a designation in said region management information of said first or second version of storage controller code originally designated as the primary version; and
      c) after designating in said region management information said other of the first or second version of storage controller code originally designated as the primary version, executing said other of the first or second version of storage controller code originally designated as the primary version, wherein between said stopping execution of said primary version of storage controller code and executing said other of the first or second version of storage controller code originally designated as the primary version no copying of storage controller code is performed.

2. The method of claim 1, further comprising:
   prior to said executing said primary version of storage controller code, reading, from information included in one of said first and second versions of storage controller code, a designation of one of said first or second versions of said storage controller code as the primary version,
   wherein said designating in said region management information said one of first or second regions of storage controller memory as containing the primary version of said storage controller code is performed in response to said reading from information included in said first and second versions of storage controller code a designation of said first or second versions of storage controller code as the primary version.

3. The method of claim 2, further comprising:
   reading, from said information included in said first version of storage controller code, an instruction to reboot and start said first version of storage controller code as soon as said storing of said first version of storage controller code in said first region of storage controller memory is complete.

4. The method of claim 3, further comprising:
   prior to said storing a first version of storage controller code in said first region of storage controller memory, executing said second version of storage controller code to control at least aspects of operation of said first storage controller.

5. The method of claim 4, further comprising:
   determining that said first version of storage controller code is less desirable than said second version of storage controller code;
   in response to said determining that said first version of storage controller code is less desirable than said second version of storage controller code, designating in said region management information said second region of storage controller memory as containing the primary version of said storage controller code and removing a designation in said region management information of said first region of storage controller memory as containing the primary version of said storage controller code.

6. The method of claim 3, wherein said storing said first version of storage controller code comprises downloading said first version of storage controller code to said storage controller from a location remote from said storage controller.

7. The method of claim 2, wherein said designating in said region management information said other of the first or second version of storage controller code originally designated as the primary version of said storage controller code comprises removing a designation in said region management information of said first or second version of storage controller code originally designated as the primary version of said storage controller code.

8. The method of claim 3, further comprising:
prior to said storing a first version of storage controller code in said first region of storage controller memory, executing said third version of storage controller code to control at least aspects of operation of said first storage controller;
determining that said first version of storage controller code is less desirable than said second version of storage controller code;
in response to said determining that said first version of storage controller code is less desirable than said second version of storage controller code, designating in said region management information said second region of storage controller memory as containing the primary version of said storage controller code and removing a designation in said region management information of said first region of storage controller memory as containing the primary version of said storage controller code.

9. The method of claim 1, wherein said storage controller code comprises
a number of storage controller code components, including at least one of a controller loader code component, a controller application code component, a controller field programmable gate array component, a complex programmable logic device code component, a power supply firmware code component, an embedded loop switch or fabric switch firmware code component, a management loader code component, and a management controller code component.

10. A data storage system controller, comprising:
memory, including:
a first version of storage controller code loaded into a first region of said memory;
a second version of storage controller code loaded into a second region of said memory, wherein said first version of storage controller code is different than said second version of storage controller code; and
region management information, wherein said region management information is not stored in first or second regions of said memory; and
a processor, wherein said processor executes a said first version of storage controller code from said first region of said memory in response to a designation included in one of said first and second versions of storage controller code and maintained in said region management information of said first region of said memory as containing a primary version of said storage controller code, wherein said processor reads said designation in said first and second versions of storage controller code and writes said designation to said region management information, wherein said processor executes said second version of said storage controller code from said second region of said memory in response to a designation maintained in said region management information of said second region of said memory as containing a primary version of said storage controller code without requiring a copying operation, and wherein said processor switches between execution of said first version of storage controller code and said second version of storage controller code without copying code from one region to another.

11. The controller of claim 10, wherein said memory comprises:
volatile memory, wherein said volatile memory includes said first and second regions of said memory; and
non-volatile memory, wherein said non-volatile memory includes said region management information.

12. The controller of claim 10, further comprising:
an interface, wherein at least said second version of said storage controller code is loaded into said second region of memory across said interface.

13. The controller of claim 10, wherein a user selection of one of said first and second versions of controller code as a primary version of said controller code determines said designation maintained in said region management information of said one of said first and second regions of said memory as containing a primary version of said storage controller code.

14. The controller of claim 10, wherein said first version of storage controller code is designated as said primary version of storage controller code and is executed from said first region of memory,
wherein said after executing said first version of storage controller code for a period of time said second version of storage controller code is loaded into said second region of memory, wherein said second version of storage controller code includes information for changing said designation maintained in said region management information of said primary version of storage controller code from said first version to said second version;
wherein after said loading said second version of storage controller code said second version of storage controller code is executed from said second region of memory, and
wherein said first version of storage controller code remains loaded in said first region of memory but is not executed.

15. The controller of claim 10, wherein said controller stops execution of said second controller code from said second region of memory and resumes execution of said first controller code from said first region of memory in response to a user command reselecting said first controller code as a primary version of said controller code.

16. A data storage system, comprising:
means for controlling data input/output operations, including:
means for storing instructions for execution, including at least a first region containing a first set of execution instructions, and a second region containing a second set of execution instructions, wherein said first set of execution instructions are different than said second set of execution instructions;
means for storing management information, wherein one of said first and second sets of execution instructions includes information designating one of said first and second sets of instructions as a primary set of execution instructions, wherein said means for storing management information are different than said means for storing instructions for execution, wherein said means for storing management information reads said information designating said one of said first and second sets of instructions as a primary set of execution instructions;
means for executing instructions, wherein one of said first and second sets of execution instructions designated as said primary set of execution instructions is executed from a corresponding one of said first and second regions of said memory, wherein said set of execution instructions that is designated as primary and that is executed does not need to be copied to said means for storing after execution of said first set of execution instructions.

17. The system of claim 16, further comprising:
means for administering;
wherein said means for controlling data input/output operations further comprises:
means for interfacing, wherein at least said second set of execution instructions is received from said means for administering.

18. The system of claim 16, wherein said means for storing management information comprises non-volatile memory means.

19. The system of claim 16, further comprising:
means for hosting data;
means for storing data in communication with said means for controlling data input/output operations, wherein data is written to and read from said means for storing data by said means for hosting data through said means for controlling data input/output.

* * * * *